US007671276B2

(12) United States Patent
Baker

(10) Patent No.: US 7,671,276 B2
(45) Date of Patent: Mar. 2, 2010

(54) ARMED JUNCTION BOX ENCLOSURE

(76) Inventor: David L. Baker, 8825 E. Fallbrook Way, Anaheim Hills, CA (US) 92808

( * ) Notice: Subject to any disclaimer, the term of this patent is extended or adjusted under 35 U.S.C. 154(b) by 281 days.

(21) Appl. No.: 11/946,186

(22) Filed: Nov. 28, 2007

(65) Prior Publication Data
US 2009/0133610 A1 May 28, 2009

(51) Int. Cl.
H02G 3/08 (2006.01)
(52) U.S. Cl. .............................. 174/50; 174/53; 174/58; 174/520; 361/643; 361/679.01; 340/539.31; 340/565; 340/541; 379/44
(58) Field of Classification Search .................. 174/480, 174/481, 50, 53, 57, 58, 17 R, 520; 220/3.2–3.9, 220/4.02; 361/643, 600, 601, 641, 679.01; 379/44, 438, 33; 340/506, 565, 572.8, 500, 340/429, 539.31, 541; 109/50
See application file for complete search history.

(56) References Cited

U.S. PATENT DOCUMENTS

| 1,112,346 | A | | 9/1914 | Wilcox |
| 2,465,935 | A | | 3/1949 | Scalia |
| 2,480,288 | A | | 8/1949 | Donadio |
| 3,295,124 | A | | 12/1966 | Burleson et al. |
| 3,556,394 | A | | 1/1971 | Caldes |
| 3,707,260 | A | | 12/1972 | Gelineau, Sr. et al. |
| 3,767,867 | A | * | 10/1973 | Altenberger ............. 379/33 |
| 3,835,461 | A | | 9/1974 | Nelson |
| 3,868,080 | A | | 2/1975 | Olson |
| 3,935,994 | A | | 2/1976 | Darvishian |
| 4,018,148 | A | | 4/1977 | Wolbrink |
| 4,033,477 | A | | 7/1977 | Hoppe et al. |
| 4,150,371 | A | | 4/1979 | Scaglione |
| 4,151,506 | A | | 4/1979 | Schoenmetz |
| 4,154,393 | A | | 5/1979 | Darvishian |
| 4,230,450 | A | | 10/1980 | LeFever |
| 4,235,491 | A | | 11/1980 | Korber |
| D260,090 | S | | 8/1981 | Hughes et al. |
| D260,876 | S | | 9/1981 | Pershyn |
| 4,287,514 | A | | 9/1981 | Wartman et al. |
| 4,297,683 | A | | 10/1981 | Roberts |
| 4,329,681 | A | | 5/1982 | Parsons |
| 4,385,288 | A | | 5/1983 | Bitko |
| 4,447,005 | A | | 5/1984 | Kelly et al. |
| 4,464,792 | A | | 8/1984 | Owerko |
| 4,520,350 | A | | 5/1985 | Huang |
| 4,583,483 | A | | 4/1986 | Rausch |
| 4,623,765 | A | | 11/1986 | Leyden |
| 4,638,129 | A | | 1/1987 | Partus et al. |
| 4,688,023 | A | | 8/1987 | McGill et al. |

(Continued)

OTHER PUBLICATIONS

Advertisement, AMESCO®, American Security Equipment Company, AB-1031 Motor Bell and Box, Dec. 1993, 1 pg.

Primary Examiner—Angel R Estrada
(74) Attorney, Agent, or Firm—Fulwider Patton LLP

(57) ABSTRACT

An armed enclosure apparatus includes a housing to be mounted on a building to encircle a telephone junction box. A cover is provided for engagement with the housing by means of a plurality of security screws. The apparatus further includes a plurality of screw tamper switch assemblies which sense tampering with the security screws and generate a corresponding signal which is transmitted along the telephone lines to a central monitoring station.

11 Claims, 4 Drawing Sheets

U.S. PATENT DOCUMENTS

| | | |
|---|---|---|
| 4,749,359 A | 6/1988 | White |
| 4,752,232 A | 6/1988 | De Luca |
| 4,800,588 A | 1/1989 | Poster, Jr. |
| 4,823,381 A | 4/1989 | Olson |
| 4,823,572 A | 4/1989 | Signorelli |
| 4,825,466 A | 4/1989 | Dowler et al. |
| 4,853,960 A | 8/1989 | Smith |
| 4,872,210 A | 10/1989 | Benages |
| 4,895,299 A | 1/1990 | Okunami |
| 4,939,960 A | 7/1990 | Kinzli |
| 5,023,595 A | 6/1991 | Bennett |
| 5,172,097 A | 12/1992 | Arnold |
| 5,227,668 A | 7/1993 | Mutch et al. |
| 5,235,133 A | 8/1993 | Roth et al. |
| 5,239,305 A | 8/1993 | Murphy et al. |
| 5,293,115 A | 3/1994 | Swanson |
| 5,315,654 A | 5/1994 | Kraft |
| 5,369,548 A | 11/1994 | Combs |
| 5,519,756 A | 5/1996 | Clift |
| 5,621,387 A | 4/1997 | Phillips et al. |
| 5,666,831 A | 9/1997 | Doros |
| 5,764,729 A | 6/1998 | Black et al. |
| 6,061,447 A | 5/2000 | Poston |
| 6,094,136 A * | 7/2000 | Wyman ................ 340/541 |
| 7,170,403 B2 * | 1/2007 | Noguchi ............ 340/539.31 |

* cited by examiner

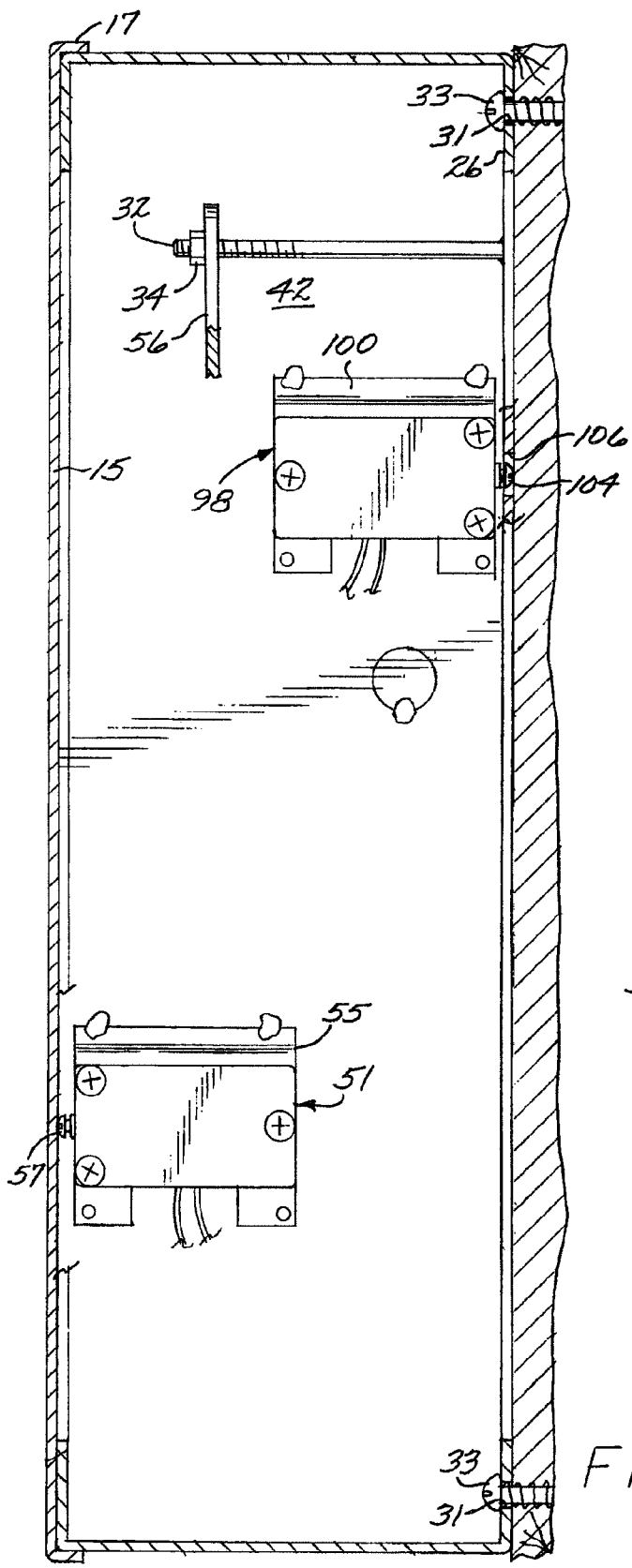
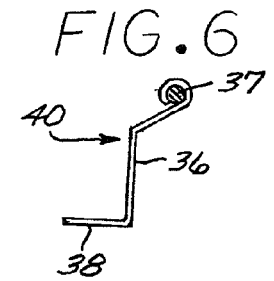
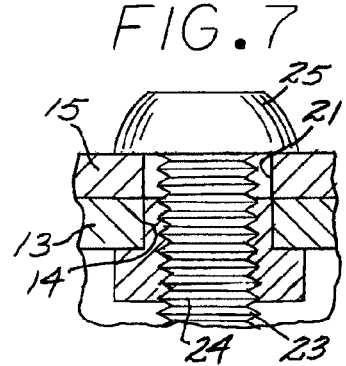
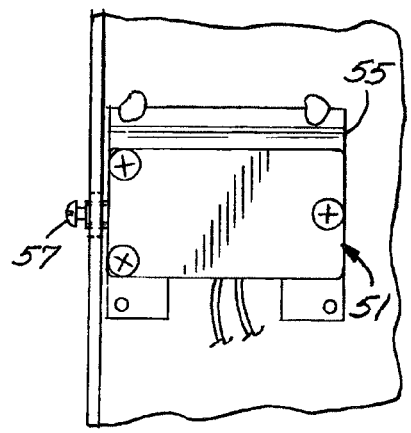

ARMED JUNCTION BOX ENCLOSURE

BACKGROUND OF THE INVENTION

1. Field of the Invention

The present invention relates to security systems and, more particularly, to such systems which mount over junction boxes to prevent tampering therewith.

2. Description of the Prior Art

Security systems have become widely popular in today's society and are used in many different applications. For instance, many times security systems are installed in automobiles in an effort to prevent those automobiles from being stolen or otherwise vandalized. Often times security systems are installed in dwellings to detect any unauthorized individuals breaking in the residence. Similarly, alarms are frequently installed in business and commercial establishments since it is appreciated that burglars believe that most business are attended at night, and that many such business establishments house very valuable equipment on the premises.

This increase in the number of alarms can be contributed to a number of factors. One such factor is that technology has made such alarm systems affordable and available to the majority of the population. Another factor is that many people today, due to job availability or other reasons, live in urban communities which are often associated with relatively high-crime rates. This leads to a sense of fear and insecurity, which for many people is to some degree alleviated by installing security systems in their homes or automobiles.

In addition, those living in more rural areas can often feel isolated and alone, and view security systems as a necessary means of protection. With the closest neighbor some distance away there is more opportunity for a burglar to access the residence without detection. In addition, police response to remote areas is often wanting.

Because of the above conditions, and due to technological advances today many security firms offer what are commonly referred to as central monitoring stations. A homeowner may install a security system in his or her residence to monitor access points like doors and windows for unauthorized entry and, if within a certain period of time a preselected code is not input into a keypad located within the residence, the security system will make contact with a central monitoring station via the residence's telephone lines to alert the station regarding the potential intruder. Such a system assures that even, if the residents of the home are unaware of the intruder, police will be notified and will respond to the residence.

The security systems, however, are not free from shortcomings. While most of these systems include some type of audible alarm, the real benefit is in the contacting of the central monitoring station which ensures a rapid police response. One significant drawback with alarms is that many people have become desensitized to the sound of an audible alarm and do not react. Often it is a false alarm, having been accidentally set off by the homeowner or car owner himself, which compounds the problem. Enterprising burglars realize this, and understand that if the telephone lines to the residence are cut such that a central monitoring station cannot be contacted, then even if the alarm in the residence is triggered, there will be sufficient time to enter the residence and remove the valuable items therefrom before anyone hearing the audible alarm might contact the authorities.

A number of devices have been proposed which mount over a telephone box and associated telephone lines on the exterior of a residence or other building to protect such lines from being severed or otherwise tampered with. A form of such device is disclosed in U.S. Pat. No. 3,868,080 to Olson. Such a device includes a channel-shaped stake adapted to be driven into the ground for receipt within the channel of the telephone line leading into the residence. A plate is secured to the upper end of the stake and has mounted thereon a telephone circuit protector. Such devices suffer from a number of shortcomings, however. In the first place, a persistent burglar can eventually breach the stake to gain access to the telephone lines to cut same and thereby prevent the security system monitoring the residence from alerting a central monitoring station of the impending break-in. In addition, such devices are vulnerable to tampering with the stake or plate without detection. Thus a burglar has the luxury of unlimited time to gain access to the enclosure and cut the telephone lines without concern for triggering the alarm.

Yet another type of security device is disclosed in U.S. Pat. No. 5,315,654 to Kraft and includes a cover which mounts over a terminal block attached to the exterior of a residence or other building. A motion sensor type alarm is included in the device to sense movement of the cover and generate an audible alarm signal in response thereto. This device is likewise not free from significant shortcomings. First of all, the alarm only activates upon removal of the cover from over the terminal block, and only generates an audible signal which, as discussed above, will often be of no benefit. Furthermore, once the cover is remove, the potential intruder will have access to the telephone lines to cut same before any type of alarm signal can be transmitted to a central monitoring station.

As such, it will be appreciated that there continues to be a need for an inexpensive reliable security device which provides a secure enclosure to protect telephone lines from being tampered with, and which is responsive to any such tampering to alert a central monitoring station before the unauthorized individual tampering with the telephone lines gains access to such lines to cut them. The present invention addresses such needs and others.

Other efforts have lead to the proposal that a rectangular tubular, open, sheet metal type frame be mounted over a juncture box. Mounted to the interior surface of the frame are mounting blocks formed with forwardly opening threaded bores. Mounted on the blocks are plunger switches having their plungers depressed by a cover held in place by threaded bolts screwed into the bores. Should a burglar remove the cover, the plungers will be free to shift the switches to their open positions activating an alarm at the central monitoring station. While effective to activate the alarm, there are considerable constraints on the switch mounting as their respective plungers have only limited travel and opening and closing thereof is critical to the effective operation of the system. In effort to solve this problem I have experimented with and even marketed some tamper proof enclosures mounting plunger switches to the inside of a rectangular housing frame with rigid L-shaped actuators mounted pivotally adjacent thereto, each having a first leg to be engaged by a cover mounting screw to, upon screwing the cover in place, rotate the respective actuators to depress the switch plungers and hold the alarm circuit closed. While effective for activating the alarm, this device suffered the shortcoming that the rigid actuators allowed for only limited play in opening and closing the respective switches thus requiring precise placement and careful adjustment upon assembly for proper activation. This tended to render the device prohibitively expensive and unacceptable for many applications. A device of this type was disclosed in my prior U.S. patent application Ser. No. 08/861,955 filed May 22, 1997, now abandoned.

SUMMARY OF THE INVENTION

Briefly, and in general terms, the present invention is characterized by an apparatus for protecting telephone lines and is responsive to any tampering to contact a central monitoring station before those telephone lines can be cut. The apparatus includes an open frame housing formed with a periphery dimensioned for mounting to a building to envelope the junction box and is constructed at its front with an inturned flange formed with bores for receipt of mounting screws. A cover is positioned over the flange and includes bores about its periphery to align with the flange bores so mounting screws may be inserted through the bores and screwed through respective nuts mounted behind the flanges. Mounted interiorly to the frame are plunger switches to be connected in circuit with an alarm circuit. Mounted in cantilever fashion to the frame adjacent the respective switches are elongated, leaf actuator springs. The springs are configured with respective intermediate sections overlying the respective plungers and are formed on their respective free extremities with drive tabs disposed in the paths of the respective screws as they are screwed to their respective closure positions, to drive the respective plungers to their switch-closed positions. Should the screws be unscrewed the tabs will tend to follow the screws thus releasing the intermediate positions of the springs to free the plungers to be biased to the respective switch opened positions to trigger an associated central alarm.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 6 is a partial vertical sectional view taken along the line 6-6 of FIG. 5;

FIG. 7 is a sectional view, in enlarged scale, taken from the circle designated 7 in FIG. 4;

FIG. 8 is a vertical sectional view, in enlarged scale, taken along the line 8-8 of FIG. 2;

FIG. 9 is a vertical sectional view, in enlarged scale, taken along the line 9-9 of FIG. 1.

DETAILED DESCRIPTION OF THE PREFERRED EMBODIMENTS

Figure 1:
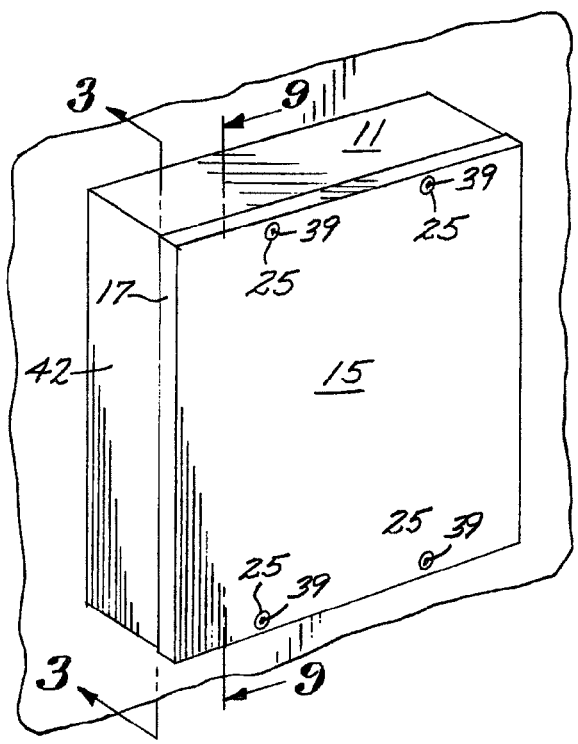
FIG. 1 is a front perspective view of the armed junction box enclosure of the present invention.
Figure 2:
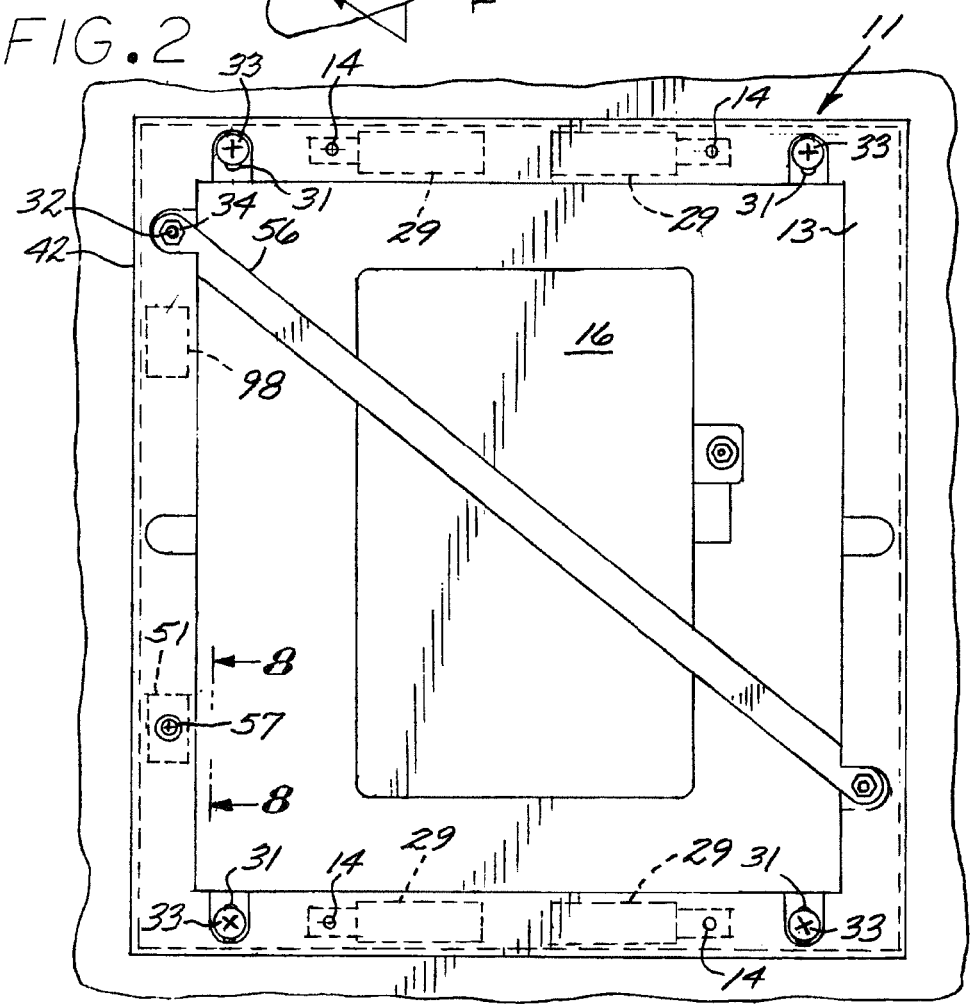
FIG. 2 is a front view, in enlarged scale, of the armed junction box enclosure apparatus shown in FIG. 1.
Figure 3:
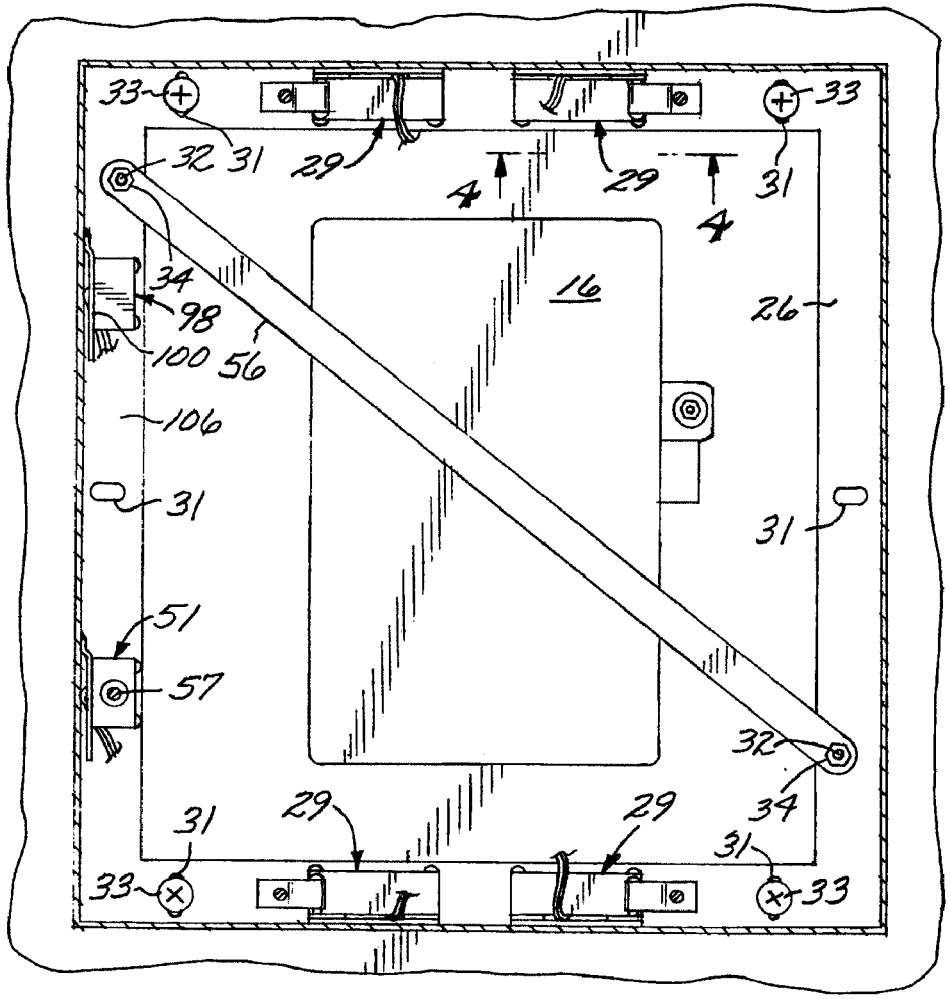
FIG. 3 is a vertical view, in enlarged scale, taken along the line 3-3 of FIG. 3.

Referring to FIGS. 1 and 3, the armed junction box enclosure apparatus of the present invention includes, generally, a rectangular open frame 11 configured at its front extremity with parametrical interned flange 13 formed in its horizontal and vertical runs with bolt holes 14. The front of the frame 11 is covered by a cover, generally designated 15, in turn, configured with a parametrical, rearwardly projecting flange 17 configured for telescopical receipt over the marginal edges of a frame. The front wall is formed in its top and bottom border area with a plurality of spaced apart mounting holes 21 (FIG. 7) for receipt therein of respective security bolts 23 for extension through the respective holes 14. The security bolts are preferably constructed of stainless steel formed having a rounded, generally hemispherically shaped tamper proof head 25 including a generally hexagonal socket 39. The bolts 23 receive self clinching nuts 24 (FIG. 7) thereon for sandwiching the cover 15 and flange 13 against the shoulders of the respective heads 25. Shaped leaf spring actuators, generally designated 40, are interposed between the respective free ends of the security bolts 23 and switch plungers to control positioning of the plungers.

Mounted interiorly to the respective top and bottom walls of the frame are pairs of plunger switches 29 arranged with the respective plungers 30 projecting longitudinally to travel in a path orthogonal to the respective axis of the bolts 23 connecting the cover to the mounting flange 13. The plungers are operative to, upon being driven inwardly through a predetermined stroke open the associated electrical switch and to then bottom out without further travel.

Referring to FIG. 9, the frame is constructed of metal and is configured on its back side with an in-turned flange 26 formed with a plurality of spaced apart elongated mounting slots 31 for receipt therethrough of respective mounting screws 33 to mount the frame to the building such that the frame encircles the periphery of telephone junction box 16. The back flange 26 mounts at its opposite sides, in diagonal alignment, a pair of forwardly projecting barrier bar mounting machine screws 32 (FIG. 9) to mount a barrier bar 56 thereto to be installed over the junction box at the time of installation. The screws 32 may be welded to the front side of the flange to receive self clinching nuts 34 thereover to hold the bar in place.

Figure 4:
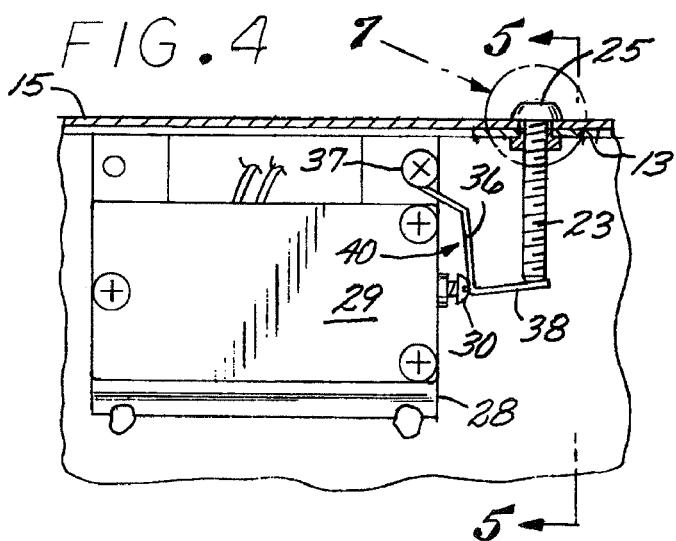
FIG. 4 is a horizontal sectional view, in enlarged scale, taken along the line 4-4 of FIG. 3.
Figure 5:
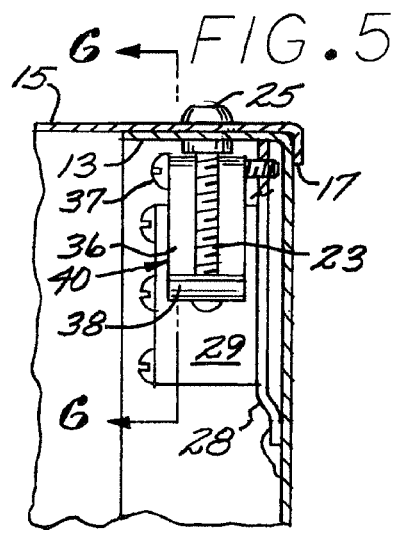
FIG. 5 is a vertical sectional view taken along the line 5-5 of FIG. 4.

Referring to FIGS. 4 and 5, the tamper switches are attached to the housing by means of respective channel brackets 28 welded to the respective top and bottom walls of the frame. Such channel brackets are preferably of identical construction for economy of manufacture. The tamper switches include respective retractable, spring loaded plungers 30 biased to their extended positions.

Referring to FIGS. 4 and 6, in the exemplary embodiment the actuators 40 are in the form of a modified S-shaped stainless steel leaf springs. The springs have respective anchor legs 36 anchored on respective mounting screws 37 and curve laterally over the ends of the respective switch housings, to project over the ends of the plungers to turn laterally and form actuation tabs 38 engaged by the respective plungers. The actuators have a sufficient spring rate and are so configured that, when anchored by the respective mounting screws 37, the intermediate portions thereof overlie the respective plungers with the tabs 38 in the paths of the respective security bolts 23 so that, as the security bolts are screwed into their closing positions the free ends thereof will engage the respective tabs to drive the actuators in, for instance, a clockwise direction as viewed in FIG. 4 to engage the plunger and close the switch.

The switches actuators 40 and bolts 23 are so arranged that, travel of the respective bolts toward their closed position is sufficient to close the switches. Any additional travel of the screws necessary to tighten the cover into position will be accommodated as lost motion by flexure of the respective springs.

Referring to FIG. 9, there is shown a cover tamper switch, generally designated 51. The cover tamper switch 51 is mounted to the housing by means of a suitable channel mounting bracket 55. The tamper switch includes a plunger 57 biased outwardly as shown in FIG. 9 to engage the inwardly facing surface of the cover. The construction of the tamper switch 51 is identical to that of the tamper switches 29 and, as such, the plunger is biased to an extended, activated position. The tamper switch 51 is mounted to the frame at a predetermined position thereon such that with the cover engaged to the housing, the plunger is driven to its recessed, deactivated position. It will thus be appreciated that if the cover is removed from the housing, the plunger will be driven by means of the internal bias applied thereto to its activated position to generate a corresponding cover removal signal.

With further reference to FIG. 9, an enclosure removal switch 98 is mounted to the inside of the frame 42 by means of a channel bracket 100. The switch 98 includes a rearwardly extending plunger 104 which projects through a clearance bore 106 normally engaged against the wall of the building to hold the switch closed. If the frame is pried loose from the building, the plunger will be biased outwardly to its activated position such that the tamper switch 98 will open to activate the circuit to the alarm.

In an alternative embodiment, the enclosure apparatus may still further include a motion detector (not shown) to sense assault by abnormal movement of the frame, such as in response to violent attacks thereupon by a potential burglar.

Figure 10:
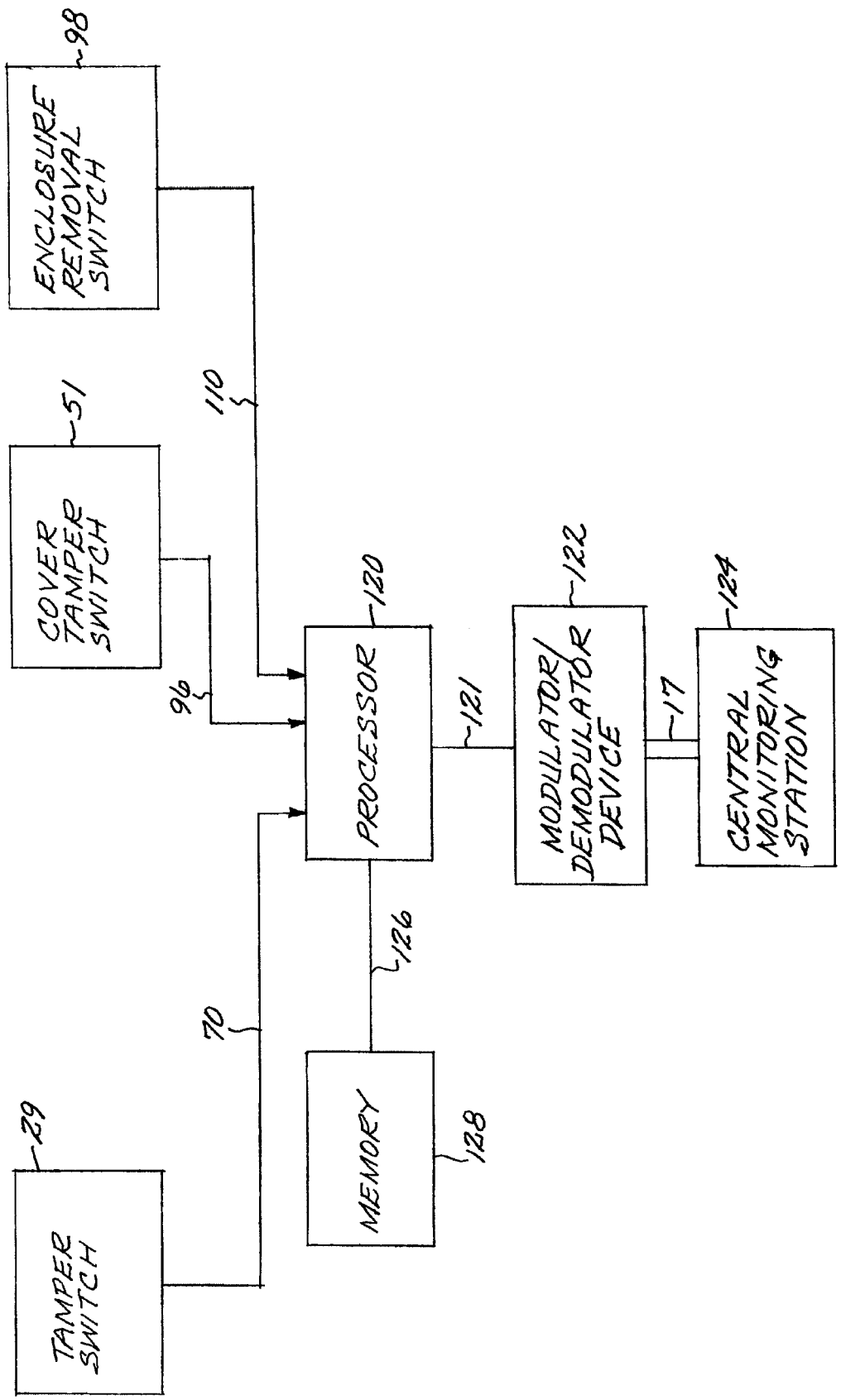
FIG. 10 is a block diagram depicting the electrical connection of the components of the telephone junction box enclosure apparatus of the present invention.

Referring to FIG. 10, there is shown a schematic block diagram of the electrical connections of the electrical components of the enclosure apparatus. The respective tamper switches 29, cover tamper switch 51, and enclosure removal switch 98 each include respective signal lines 70, 96 and 110 which carry the respective warning signals generated by the sensor switches. Such signal lines are connected to a processor 120 which is operative to control the operation of the system. The processor includes circuitry operative to sense receipt of the corresponding alarm signals and which is responsive thereto to generate a corresponding alarm signal. The processor is connected via a signal line 126 to a read only memory 128 (ROM). The ROM contains programs that are retrieved and implemented by the processor to control the operation of the system. The microprocessor is electrically connected via signal line 121 to a modular/demodulator device 122 (i.e. a "modem"), and many retrieve from the ROM programs which control the modulator/demodulator device to contact a central monitoring station 124 via the telephone lines 17 and to transmit a signal thereto which includes the alarm signal and information identifying the corresponding residence where the tampering is taking place. Thus it will be appreciated that upon receiving a signal from any of the sensor assemblies, the processor automatically establishes communication with the central monitoring station to alert such station regarding the tampering with the enclosure apparatus.

It will be appreciated that the respective sensor switches could also be electrically connected to an existing alarm system within the residence, such system being responsive to receipt of an alarm signal from the enclosure apparatus to contact the central monitoring station 124, thereby alleviating the need for a separate processor and modulator/demodulator device. In addition, the processor 120 could be mounted inside the frame or alternatively could be disposed at a remote location such that even if an individual were to gain access to the inside of the enclosure apparatus, the processor would remain inaccessible and could still perform its function of contacting the central monitoring station.

In use, a worker may select a frame 11 and cover 15 having the appropriate dimensions for encasing the particular junction box 16 to be protected. The junction box is mounted to the building and wired. The frame 11 will then be positioned over the junction box 16 and the mounting screws 33 (FIG. 9) inserted through the slots in the mounting flange. The barrier bar 56 may then be placed over the junction box with the machine screws 32 received in the bores and the threaded nuts 34 screwed thereover to hold the bar in place. The worker may then place the cover 15 over the housing to register the mounting holes 21 with the respective mounting bores 14 in the flanges 13 (FIG. 7). The security bolts 23 may then be extended through the respective bores in this cover and frame and threadedly engaged with the self clinching nuts 24 and screwed into cover closing position.

Referring to FIG. 4, it will be appreciated that as the distal ends of the bolts 23 travel along their path perpendicular to the axis of the respective plungers they will engage the respective tabs 38 to drive them distally to thereby flex the respective actuators and flexibly rotate their respective free ends about their respective anchor screws to rotate them, for instance, clockwise as viewed in FIG. 4, to engage the plunger and drive it to the left to close the switch and the corresponding circuit. The flexure in the actuators 40 affords a certain freedom in designs and assembly in that the positioning in assembly need not be precise. That is, the inherent flexure in the leaf spring design of the actuators will provide for a certain degree of lost motion of the closure bolts after switch closure, all without applying excessive stress or placing a permanent set in the actuator.

Should an authorized individual attempt to remove the cover 15 by unscrewing the security bolts 23, it will be appreciated that such individual will first have to acquire a special tool designed for manipulating the specially configured screws. Even if that individual should be in possession of such a tool, once he or she begins to unscrew any of the security screws, the corresponding tamper switch 29 will be opened to generate a warning signal indicative of such tampering which is transmitted to the processor 120. Should the individual then succeed in grasping the cover 15 and prying it off the frame not only will the tamper switch be actuated, the cover tamper sensor will also be actuated to transmit a warning signal to the processor. If the entire frame is removed from the building, that will trigger the enclosure removal switch 98 to transmit a corresponding warning signal to the processor thus sounding an alarm.

From the foregoing, it will be appreciated that the enclosure apparatus of the present invention provides an inexpensive and reliable enclosure to restrict unauthorized access to a telephone junction box. The apparatus is inexpensive to manufacture and assemble, yet providing full proof protection.

While a particular form of the present invention has been illustrated and described, it will also be apparent that various modifications can be made without departing from the spirit and scope of the invention. Accordingly, it is not intended that the invention be limited, except as by the appended claims.

I claim:

1. Armed junction box enclosure for securing a junction box mounted to a wall and comprising:
   a frame for mounting to the wall and configured to circumscribe the box and including inurned front and rear peripheral flanges;
   the front flanges being formed with through flange bores;
   a cover for covering the front of the frame and including through cover bores aligned with the respective flange bores;
   threaded fastener bolts configured with respective threaded shafts having free ends for projecting paths through the respective aligned flange and cover bores and including respective tamper proof heads for, when the bolts are in their respective fastening positions, nesting against the cover to position the respective ends at respective predetermined locations;

fastener nuts receiving the respective shafts;

switch devices including switch housings mounted to the interior of the frame adjacent the respective flange bores, including plungers biased to project from the housing along respective selected paths and being depressible along respective plunger strokes to close respective electrical switches; and elongated leaf spring actuators mounted to the frame adjacent the respective switch devices and interposed between the respective plungers and free ends of the shafts and including respective actuating tabs located in the respective predetermined paths, the actuators operative upon the respective bolts being inserted along the respective predetermined paths and engaging the respective actuating tabs, to drive the respective plungers through their respective strokes to hold the respective switches closed and to, upon further advancement of the respective bolts, flex to allow for travel of the bolts to their respective fastening positions.

2. The armed junction box enclosure of claim 1 wherein:
the switch devices are mounted to position the predetermined and selected paths perpendicular to each other.

3. The armed junction box enclosure of claim 1 wherein:
the actuator in cantileverally mounted.

4. The armed junction box enclosure of claim 1 wherein:
the actuator is, in its relaxed state, S-shaped.

5. The armed junction box enclosure of claim 1 wherein:
the frame is constructed of metal; and
the enclosure includes metal channel brackets welded to the frame and mounting the respective switch housings.

6. The armed junction box enclosure of claim 1 wherein:
the fastener bolts are constructed of stainless steel.

7. The armed junction box enclosure of claim 1 wherein:
the actuators are constructed of stainless steel.

8. The armed junction box enclosure of claim 1 that includes:
a barrier bar projecting from one side to the other of metal frame.

9. An enclosure for shrouding a junction box mounted to a wall and including:
a frame for mounting to the wall and configured to circumscribe the box, the frame including and in-turned front flange formed with at least one through flange bore;

a cover for covering the front of the frame and including at least one cover bore configured to, when the cover is in covering relationship on the frame, align with the flange bore;

a bolt formed with a tamper resistant head to engage the cover and having a threaded shaft to be inserted in a predetermined path though the aligned cover and flange bores and to, when the head is engaged with the cover, be positioned at a predetermined location;

a threaded fastener for receiving the shaft;

a cover monitoring switch housing mounted to the interior of the frame adjacent the flange bore and including actuator plunger having a plunger stroke to, when driven to a depressed position close an electrical switch and then reach the limit of its stroke; and a elongated resilient actuator anchored to the frame, interposed between the plunger and bolt and configured to, as the bolt is inserted through the aligned cover and flange bores, be engaged by the bolt to, upon further travel of the bolt, be shifted to drive the plunger through its stroke to close the electrical switch and to, when the plunger reaches the limit of its stroke, flex to allow for travel of the bolt to continue until the head nests against the cover.

10. The enclosure of claim 9 wherein:
the actuator is constructed of flexible stainless steel.

11. The enclosure of claim 9 wherein:
the actuator is in the form of an S-shaped stainless steel spring release.

\* \* \* \* \*